(12) United States Patent
Funes Mora

(10) Patent No.: US 10,444,831 B2
(45) Date of Patent: Oct. 15, 2019

(54) USER-INPUT APPARATUS, METHOD AND PROGRAM FOR USER-INPUT

(71) Applicant: Eyeware Tech SA, Martigny (CH)

(72) Inventor: Kenneth Alberto Funes Mora, Lausanne (CH)

(73) Assignee: Eyeware Tech SA (CH)

( * ) Notice: Subject to any disclaimer, the term of this patent is extended or adjusted under 35 U.S.C. 154(b) by 46 days.

(21) Appl. No.: 15/370,836

(22) Filed: Dec. 6, 2016

(65) Prior Publication Data

US 2017/0160797 A1    Jun. 8, 2017

(30) Foreign Application Priority Data

Dec. 7, 2015    (CH) ..................... 01778/15

(51) Int. Cl.
*G06F 3/01* (2006.01)
*G06F 3/0484* (2013.01)
*G06F 3/0482* (2013.01)

(52) U.S. Cl.
CPC .............. *G06F 3/012* (2013.01); *G06F 3/017* (2013.01); *G06F 3/0482* (2013.01); *G06F 3/04847* (2013.01)

(58) Field of Classification Search
None
See application file for complete search history.

(56) References Cited

U.S. PATENT DOCUMENTS

| 2006/0119574 A1 | 6/2006 | Richardson et al. |
| 2006/0148323 A1 | 7/2006 | Canzler et al. |
| 2008/0159596 A1 | 7/2008 | Li et al. |
| 2014/0201666 A1 | 7/2014 | Bedikian et al. |
| 2016/0335916 A1* | 11/2016 | Lee ........................... G06F 3/00 |

FOREIGN PATENT DOCUMENTS

| DE | 202012005255 U1 | 8/2012 |
| WO | WO-2013/168171 A1 | 11/2013 |
| WO | WO-2014/060995 A1 | 4/2014 |

OTHER PUBLICATIONS

"A closer look at iOS 7.1's accessibility changes", Josh de Lioncourt, Macworld, Mar. 13, 2014.*
O. Spakov, et al., "Enhanced Gaze Interaction Using Simple Head Gestures", UbiComp, Sep. 12, 2012, pp. 705-710.

* cited by examiner

*Primary Examiner* — Brian M Butcher
(74) *Attorney, Agent, or Firm* — Blank Rome LLP

(57) ABSTRACT

User-input apparatus for head gesture based control comprising: a camera for recording a head of a user; a database for defining a plurality of gestures of the head of the user and for relating at least some of the defined gestures to a corresponding user command; a detector for detecting one of the gestures defined in the database in the recording of the camera; a controller for identifying a user command in the database related to the detected gesture and for giving out the user command related to the detected gesture; wherein one of the defined gestures of the head is a switching gesture and one of the user commands is a switching command related to the switching gesture, wherein, when the switching command is given out from the controller, the user-input apparatus switches between a use mode for the head gesture based control and a settings mode.

14 Claims, 3 Drawing Sheets

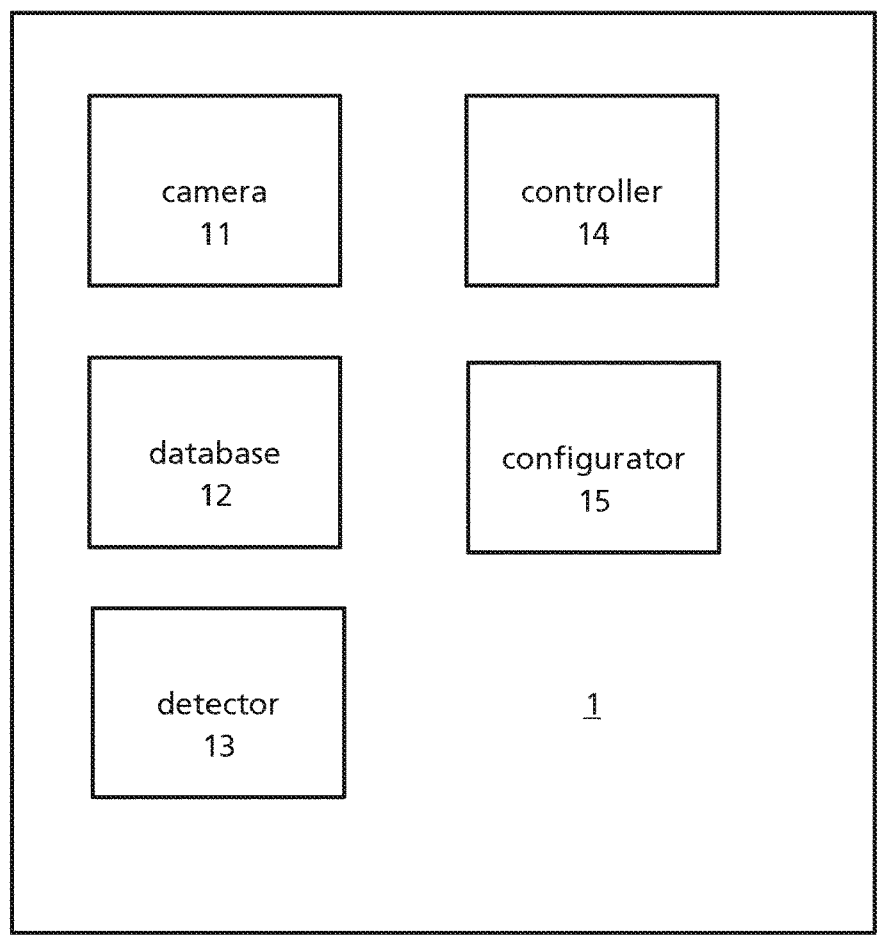
Fig. 2
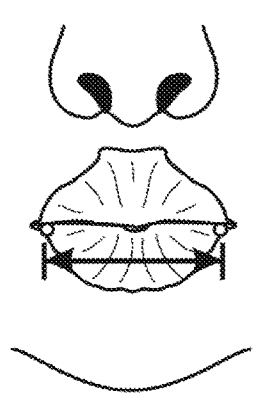 
Fig. 3  Fig. 4

USER-INPUT APPARATUS, METHOD AND PROGRAM FOR USER-INPUT

This patent claims priority of the Swiss patent application 01778/15 filed on Dec. 7, 2015, the content thereof is hereby incorporated.

FIELD OF THE INVENTION

The present invention concerns user-input apparatus and a method and a program for user-input, in particular without the need of the user's hands.

DESCRIPTION OF RELATED ART

The devices for inputting user commands in electronic devices is numerous including mouse, keyboard, touch pad, joystick. But most of those user-input devices require the use of the hands of the user. However, some persons with motor disabilities or with temporary inabilities may not be able to use their hands for controlling electronic devices. Similar problems arise, when users wants to control electronic devices during activities which occupy their hands.

WO2014/060995 discloses a user-input device which detects the pitch and the roll movement of the head of the user in order to control the movement of a cursor. The mouse click is detected by a certain sound produced by the user. The user-input device is calibrated on the parameters of the individual user in order to improve the interaction quality. US2006/0148323, US2006/0119574, DE202012005255U1, US2014/0201666, WO2013/168171 and US2008/159596 disclose similar systems.

The present user-input devices of the state of the art require often complex settings mechanisms, in particular the calibration mechanisms. Often those setting mechanisms require the use of conventional user-input devices and therefore can often not be performed without using hands.

BRIEF SUMMARY OF THE INVENTION

It is an object of the invention to find a user-input method, apparatus and program which overcomes the disadvantages of the state of the art.

It is an object of the invention to find a user-input method, apparatus and program which can be used without hands and in particular switched in a calibration or settings mode more easily.

This is achieved by user-input method, device and program according to the independent claims.

By switching between the use mode and the settings mode of the user-input method, apparatus and program by a head gesture, the operational mode switching can be performed easily by any person without the need of the hands. In addition, this allows to configure, in particular to re-calibrate, the system or to spontaneously and temporally switch into the settings mode which normally takes the complex selection out of a menu which could be cumbersome to select for a short time by head gestures.

This is further achieved by a user-input apparatus for head gesture based control comprising a camera for recording a head of a user, a database for defining a plurality of gestures of the head of the user and for relating at least some of the defined gestures to a corresponding user command, a detector for detecting one of the gestures defined in the database in the recording of the camera and a controller for identifying a user command in the database related to the detected gesture and for giving out the user command related to the detected gesture, wherein the gestures defined in the database comprises a kiss gesture related or to be related to a confirmative user command.

BRIEF DESCRIPTION OF THE DRAWINGS

The invention will be better understood with the aid of the description of an embodiment given by way of example and illustrated by the figures, in which:

FIG. 2 shows an embodiment of a user-input apparatus.

FIG. 3 shows a first embodiment to detect a kiss gesture.

FIG. 4 shows a second embodiment to detect a kiss gesture.

DETAILED DESCRIPTION OF POSSIBLE EMBODIMENTS OF THE INVENTION

The user-input method, apparatus and program is configured to translate certain gestures of the head of the user into user commands. Before describing the details of the user-input method, apparatus and program, some terms shall be defined.

The term gesture of the head shall comprise any sequence of head situations. A head situation shall comprise a head pose and/or a head feature. Therefore, a gesture of the head can be either any sequence of head poses or any sequence of head features or both. The gesture could comprise either a sequence of head situations with varying head situations over the sequence time or a sequence of head situations with a constant head situation over the sequence time.

Figure 1:
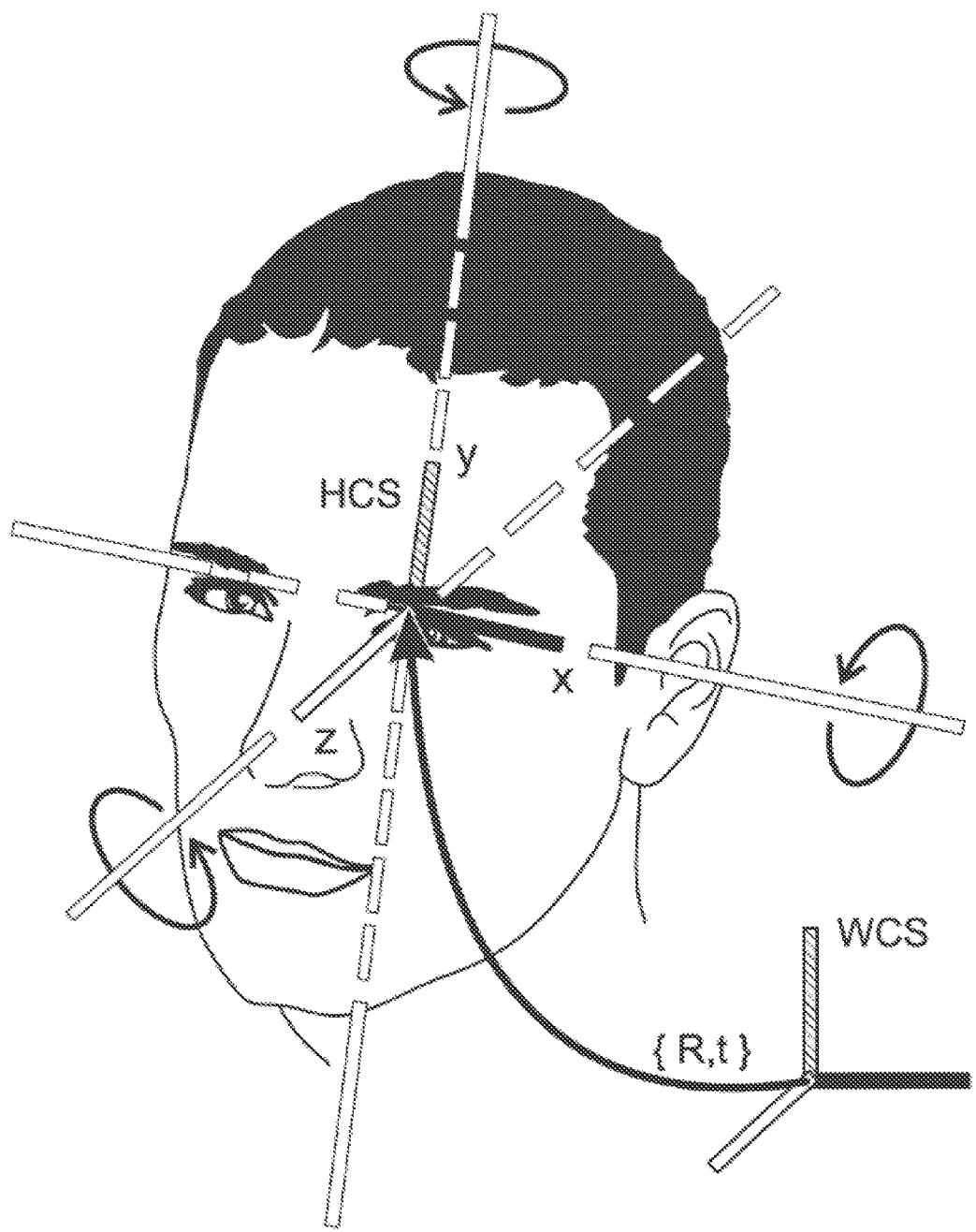
FIG. 1 shows a view of the camera and the head coordinate system and the principle head movements.

The head pose refers to the relative position of the head coordinate system HCS relative to a world coordinate system WCS as shown in FIG. 1. The relative position of the HCS can be expressed by a head rotation R and a head translation t with respect to the WCS. The HCS could be defined within the head of the user for example by an x-Axis in the direction of a direct line between the two ears, a y-axis in the vertical direction of the head and the z-axis in the direction rectangular to the x- and y-axis, i.e. pointing from the nose to the back-head. However, other HCS are possible. The WCS could be for example the coordinate system of the camera described later. Consequently, a gesture of the head comprising a sequence of head poses could comprise either a sequence of head positions or a sequence of head rotations or both.

The three principal head translations are horizontal (direction of the x-axis of WCS), vertical (direction of the y-axis of WCS) and frontal-backward movement (direction of the z-axis of WCS) in FIG. 1. Consequently, a gesture of the head comprising a sequence of head translations could comprise a sequence of either a vertical movement or a horizontal movement or a frontal-backward movement or any combination of those.

The three principal head rotations can be defined as pitch (vertical rotation), yaw (horizontal rotation) and roll (longitudinal rotation) as shown in FIG. 1. Consequently, a gesture of the head comprising a sequence of head rotations could comprise a sequence of either pitching or yawing or rolling or any combination of those.

A head rest pose is the head pose most likely to be observed during a period of time when the user has the highest comfort and/or when the user does not perform any head pose gestures and/or when the user normally works with the electronic device. The head rest pose is preferably modelled as the rest coordinate system (RCS), which is defined as a fixed rigid transform (3D rotation and/or translation) from the WCS.

The sequence of head situations is computed with respect to the WCS and/or the RCS and/or the HCS.

A head shake is an oscillatory pitching or yawing movement of the head without substantially changing the other two angles. The oscillatory pitching movement refers to a vertical head shake while the oscillatory yawing movement refers to a horizontal head shake. A head shake cycle comprises the rotation of the head (pitching or yawing) in a first direction, in the opposite second direction and again in the first direction. A head shake can comprise one, two, three or more head shake cycles, as well as intermediate amounts, like 1.5 cycles, but typically head shakes are measured in more than 1 cycle.

The head feature refers to any feature of the head within the HCS. The most important head features are probably face features, like eyes, gaze (preferably the point of regard), mouth, nose, eyebrows, lips, tongue, ears, hair, etc.

Face features are often detected by using facial landmarks and/or by using a face model and/or eye and gaze estimation models. Facial landmarks commonly denote a set of 2D points within the face image associated with discrete and semantic elements of the face. For example, one landmark can follow the position of the left mouth corner. Preferably, the facial landmarks are found within a frontal normalized face image. This means that facial landmarks are obtained as a measure consistently invariant to the head rotation, translation or the distance of the user to the camera. Provided shape information, the landmarks can also be defined as 3D points within the head coordinate system (HCS). Alternatively or additionally a face model can be used for detecting face features. The face model is a 3d representation (e.g. a 3D mesh) of the face of the user. Alternatively or additionally, the face model is based on active shape models, active appearance models or 3D morphable models.

An eye and gaze estimation model infer the eyeball orientation and/or gaze from facial data observations. Gaze may then denote the 3D line of sight, the point of regard within the 3D setup or the 2D point of regard within a screen, or a discrete target which can be labelled as one of a set of semantic objects, such as the "screen", the "camera", the "table", etc.

FIG. 2 shows an embodiment of a user-input apparatus 1. The user-input apparatus 1 comprises a camera 11, a database 12, a detector 13, a controller 14 and a configurator 15.

The camera 11 is configured to record the head of the user. In one embodiment, the camera 11 is an optical camera recording a continuous sequence of 2D images of the head of the user, e.g. an RGB camera. Typically, the camera 11 is a digital video camera as often already installed in electronic devices like smartphones, laptops, personal computers, etc. In another embodiment, the camera 11 is a 3D scanner configured for recording a sequence of 3D images of the head of the user such as a time-of-flight camera, a multi camera, a depth-map camera, etc. Most preferably a combination of an optical camera and 3D scanner is used, e.g. a RGB-D camera (RGB camera with a depth camera in one device). Preferably such a combination of the 3D scanner and the optical camera is arranged such that the optical camera being arranged next to the 3D scanner as usually the case in RGB-D cameras and/or with a fixed spatial relationship. The camera frame rate should be high enough to follow human movements.

The database 12 is configured to define a plurality of gestures of the head of the user. Gestures correspond normally not to one exact sequence of head situations, but rather a sequence of head situations which lays in a defined range of sequences of head situations representing this gesture. This can be for example achieved by defining a certain parameter set range defining this gesture. The database 12 comprises further a number of user commands. Preferably, each or at least a number of the user commands is related to one of the gestures defined in the database 12. The database 12 could comprise also a plurality of users or the possibility to define a plurality of users with user specific data (user profiles). For example the relation between the gestures and the commands could be different for each user and could be configured by the user. Also the definitions and/or detection of each gesture could be user dependent, so that the detection of a gesture of a specific user is improved by considering the head features of the specific user. The database 12 could also include user specific head features per user which could be used to improve the detection of the head gestures. Those user specific data could be changed in a settings mode described below. The database 12 could comprise several sub-databases forming the database 12. For example, the gestures of the head of the user and the user commands could be in distinct sub-databases.

The gestures can be distinguished roughly by their function. There are confirmative gestures which are related to confirmative user actions and direction gestures which are related to directional user actions. Confirmative gestures are one or more of the following: Kiss, eyebrow rising, mouth opening, eye blinking (right, left, double eye blinking), tongue tip showing, horizontal head shaking, vertical head shaking, forth/up/side and back head translation. Directional user gestures are one or more of the following: head rolling, head pitching, head yawing, head translation, tongue tip movement, gaze direction or gaze movement.

Preferably, the database 12 comprises at least two gestures having the same sequence of head situations but distinguishing by the speed or acceleration of the sequence of head situations. For example the horizontal head shake can be performed slow, normal or fast and have thus three different user commands related to it. It is also possible that a gesture relates to two user commands depending, if the sequence of head situations is performed smooth or sudden.

Preferably, the database 12 comprises at least two users or the possibility to register at least two users, wherein the first user has a first one of at least two speeds and the second user has a second one of the at least two speeds. Thus, one of the at least two speeds can be associated to each user (also for only one user) to adapt the gesture speed to the speed of the user. The detection of a given gesture can therefore be confirmed only if observed at a given speed for a particular user, but not confirmed if it is observed at the same speed for another user.

The user commands defined in the database 12 comprise directional user commands and confirmative user commands. The confirmative user commands correspond to the following user commands of a computer: mouse click, left mouse click, right mouse click, a specific key command, power on/off system control, mouse centering. The directional user commands correspond to the following user commands of a computer: cursor movement, scrolling.

The kiss gesture is a movement of the mouth in which the lips move normally closer towards the mouth center but mainly forward within the HCS. This gesture is preferred for confirmative user commands as it is unlikely to be exhibited during normal activities such as talking and leads thus to a low number of false positive commands. In one embodiment the kiss could be detected on the basis of the distance between the left and right corner of the mouth which are both landmarks extracted, e.g. from a 2D video as shown in FIG. 3. In another embodiment given the availability of depth data provided by the camera 11 and/or a rigid or non-rigid face model, a more robust detection could be the following. If we define a plane in front of the mouth, which is positioned as shown in FIG. 4, we can observe that a kiss gesture will be the main mouth gesture which will make the lips go through the virtual plane. Therefore, using head pose tracking and/or depth information and/or the face model, we can detect the gesture by measuring the amount of 3D points nearby the expected mouth position which crosses the virtual plane. Therefore, measuring whenever the lips move forward. Preferably, this plane is defined specifically for the given user (from a personalized face model) within the HCS. This makes the gesture detection to be robust, as it is independent of the head pose, distance to the camera, and it is adapted to the current user. Alternatively, an embodiment could comprise a parametric face model such as an active appearance model, an active shape model or a 3D morphable model in which the kiss gesture is detected on the basis of a machine learning classification algorithm relying on the facial deformation parameters and/or mouth appearance as features. A combination of the aforementioned embodiments could be possible. The kiss gesture is due to its robustness preferred to be used for realising a mouse click, in particular a left mouse click.

A head shake gesture could be detected by surveying the yaw and/or pitch angle in the frequency domain. If the energy of the yaw and/or pitch in a certain frequency range goes above a threshold, a head shake is detected. Alternatively, a machine learning classification algorithm could be used to classify features composed of a frequency transform such as a discrete Fourier transform, convolved filters and facial features position are mapped into the gesture detection label. If head shakes with different speeds shall be detected, different frequency ranges are related to different gestures (slow-fast or slow-normal-fast). Since the speed and/or acceleration of a head shake can be well controlled by a user, this gesture is well suitable for different speeds. Alternatively, the frequency ranges may be adapted to different users. In addition, the head shake gestures can be distinguished by the number of shake cycles (repetitions). A head shake with one cycle could be related to another user command than the head shake with two or three shake cycles. The head shake can be used to turn off (and also on again) the head gesture control which could be useful, when the user needs to move his head without controlling the device. Preferably a vertical head shake is used for this embodiment. Preferably a head shake with one cycle is used. The head shake can be used for centring the mouse on the display. Preferably a horizontal head shake is used for this embodiment. Preferably a head shake with one cycle is used. The head shake can be used for setting or calibrating the user-input apparatus (described later). Preferably a horizontal head shake is used for this embodiment. Preferably a head shake with at least two shake cycles is used, in particular with three shake cycles. All those functions and even more can be controlled by head shakes, due to the distinction between vertical-horizontal and/or number of shake cycle(s) and/or speed or acceleration of the head shake.

The eyebrow gesture, the eye blink gesture and the mouth opening gesture can be easily detected on the basis of the facial landmarks, preferably related to the HCS.

The head translation gesture denote a forward, backward, sideward, upward, downward or combined directional translation of the head pose followed by a translation back to the original head pose all under a minimal head rotation. This translation may be computed for a specific point within the head such as the tip of the nose. The direction of the movement to be monitored may thus be defined a priori with the WCS and/or RCS and/or HCS. The head translation gesture can be used for confirmative user commands as well as for directional commands. E.g. the forward and/or backward translational movement where forward means towards the screen could be used for a mouse clicks. By monitoring head translations along different directions, it is possible to distinguish between right and left click.

The tongue showing or tongue taking out gesture is also suitable for confirmative commands, as it is normally performed deliberately. This can be detected using a mouth-detailed facial model and/or by monitoring depth measurements crossing a virtual plane defined within the HCS.

The tongue tip movement gesture can also be used for any directional commands like scrolling or moving the cursor. The tongue tip position relative to a rest position (of the mouth, the tongue, or something else) could indicate the direction and/or amplitude for a certain user command.

The head roll gesture is also very robust, because we do not perform much head roll variations, most head rotations are either vertical or horizontal. This makes head rolls interesting for computer control, as most observations of head roll variations will be interpreted as deliberate. The roll can be computed as the roll angle estimated from the rotation matrix relating the current user's head pose to the user's head rest position (RCS). The roll command could be used to scroll in two directions. The scrolling velocity could depend on the value of the above-mentioned roll angle. Preferably, the velocity depends non-linearly on the value of the above-mentioned angle. Preferably, the roll gesture is only detected, if said difference goes above a certain threshold.

The head pitch and the head yaw gesture is preferably used to control the position and/or movement of the cursor. Preferably, the pitch and/or yaw rotation has another effect, when performed with high velocity and/or high acceleration, e.g. to change displays like the tab button on the computer. Preferably, the pitch/yaw angle estimated from the rotation matrix relating the current user's head pose to the user's head rest position (RCS) are the parameters for detecting the pitch and yaw gestures. Preferably, the cursor velocity depends non-linearly on the current and/or previous values of the above-mentioned pitch/yaw angles and/or the current and previous cursor position.

Since the pitch and the yaw gestures are often performed, the pitch and yaw gestures for controlling the mouse cursor could include additional conditions. One of those additional conditions would be to disable the mouse control when the user does not look on the screen or does not look in the region around the cursor and/or to enable the mouse control when the user looks on the screen or looks in the region around the cursor. This can be achieved by including in the yaw and/or pitch gesture the additional condition of the user gaze being in the direction of the screen and/or of a region around the cursor and/or at the cursor. Such a gaze based enabling/disabling of the mouse control could also be applied for other gestures controlling the movement and/or position of the cursor.

The gaze gesture alone is problematic for controlling the cursor position/movement. This is first due to the fact that many gaze movements could be tiring and second due to the fact that the gaze detection is not very exact in many embodiments. However, a gaze direction could be used to roughly position the cursor, while the fine position is controlled by another gesture, e.g. a head pose gesture, preferably the above-described yawing and pitching. This is much less tiring, much more exact and at the same time increases the velocity of cursor placement on the screen. To improve the control, the cursor replacement on the basis of the gaze could be bound on another condition like a gaze direction change above a certain threshold or like another gesture (closing one eye or something the like).

Since many gestures in particular many head pose gestures depend on the rest head pose (rest head position and/or rest head rotation), in one embodiment the rest head pose is constantly adapted to the actual rest head pose. Since the actual rest head pose must be well distinguished from the actual head pose (which is normally used to detect head pose gestures), the adaption of the rest head pose could be performed by applying a low pass filter with a large temporal range on the actual head pose of the user. Alternatively, the head rest position may be adapted when detecting head gestures which are independent of the head rest position where one gesture within the database 12 may be assigned to the purpose of redefining the head rest position.

The detector 13 is configured to receive the recordings of the head of the user, e.g. 2D-video frames and/or depth frames and/or 3D-mesh frames. The detector 13 is further configured to detect within the received recordings head gestures defined in the database 12. Therefore, the detector 13 preferably extracts parameters of the recordings and checks, if the parameters are in the parameter set range of one of the defined head gestures. Preferably, the detector 13 should be able to detect the facial landmarks and/or the face model or in general the head situation without the need of any markers mounted on the user.

The controller 14 is configured to receive from the detector 13 any detected gesture defined in the database 12. The controller 14 is configured to check in the database 12, if a user command is related to the received detected gesture. If such a user command is related to the received detected gesture, the controller 14 gives out this user command.

The controller 14, the detector 13 and the database 12, the calibrator 15 or a sub-combination of those could be realized in one single means or section.

Preferably, only one user command is related to one gesture so that only one user command is given out, when the one gesture is detected. However, it is also possible for the user to define more than one user command to be related to one gesture and thus to be carried out, when the gesture is detected. Preferably, only one gesture is related to one user command so that only one gesture leads to the one related user command. However, it is also possible for the user to define more than one gesture to the same user command so that different gestures lead to the same user command. It is also possible that some user commands are not related to a corresponding gesture and/or some gestures are not related to a corresponding user command. In the latter case, even if a defined gesture is detected, no user command will be given out. Those additional gestures are useful, because some users are not able or do not like to perform certain gestures and can thus replace certain gestures. In the first case, this can be useful, because not every user needs all the commands. A lower number of gestures leading to a user command reduces the false detection events and allows to increase the robustness of the detection, if the user does not need all user commands. The change of relation of the user commands to gestures by the user can be performed by the configurator 15 described in the following.

The configurator 15 is configured to change the settings of the input apparatus. Settings are for example the mouse speed, the volume of the audio, the brightness of the display, user profiles, selection of a user, change of setting modes, etc. and in particular calibration parameters of the gesture control. Setting the calibration parameters means here either changing the relation between a user command and a gesture (as described in the previous paragraph) or changing the parameters for detecting gestures or adding new gestures or user commands or other user configurations or any combination thereof for a specific user.

The calibration may include the change of parameters related to a specific gesture and to improve the detection robustness during use mode. This process may be done by manually changing the gesture parameters values by means of head gestures interacting with a graphical interface. Alternatively the user may conduct a repeated recording of said gesture. The parameters are then inferred by computing the values that best trigger the gesture detection during said recordings and/or previous data observations.

The calibration could also include the registration of new gestures. Preferably, this includes the step of selecting the new gesture registration process, the step of recording the new gesture of the user, the step of identifying the parameter(s) defining the new gesture, storing the new gesture in the database 12. The step of recording the new gesture of the head of the user could include the repeated recording of this new gesture in order to more robustly find the parameters describing this gesture. Those parameters could be found with several measures. One way could be to select the parameters with the biggest changes. Another way is by means of supervised or semi-supervised machine learning classification algorithms. Once the new gesture is registered in the database 12, a user command could be related to the new gesture.

The calibration could also include the definition of new user commands. Preferably, this includes the step of selecting the new user command registration process, the step of defining the new user command and the step of storing the new user command in the database 12. The new user command can then be related to one of the gestures defined in the database 12.

One example for a calibration command would be a head rest pose procedure. Once this command for the head rest pose procedure is started, the head rest pose is determined (adapted or newly captured). This can be done for example by holding the head still for a configurable amount of time (e.g. 1-3 seconds). When the system detects the head being still during that time, the head rest position is recorded and used in later stages. In one embodiment, the mouse pointer is being positioned in the center of the screen in order to elicit that the user orients their head naturally to the center of the display, which is ideal for the head rest pose.

In one embodiment, the calibration command could cause the change of a user. Where the user input apparatus can be used by different users, each user has a calibration profile defining e.g. the relations between head gestures and user commands, head rest pose, etc. When the calibration command causes the change of the user, the calibration of the head based gesture control is changed from the parameters of the previous user to the parameters of the newly selected user.

In one embodiment, the calibration command comprises a process for detecting the head features of the user, e.g. the facial 3D shape, eyeball shape and position, appearance, objects on the head, etc. are recorded. These head features can be used as a baseline for processes like eye-gaze estimation or facial gestures recognition.

In a preferred embodiment, the user-input apparatus comprises at least two operational modes: A use mode and a settings mode. Preferably, it comprises also an idle mode. In the use mode, the user-input allows to perform the above described head gesture based control as defined in the database 12. In the settings mode, the user-input apparatus allows to perform the above described settings by the configurator 15. In the idle mode, the at least a part of the head gestures related in the database 12 with user commands and causing in the user mode the related user commands when they are detected are switched off in the idle mode so that they do not cause the related user commands. Preferably, all head gestures except the head gesture for switching back in the use mode are switched off.

The user-input apparatus is configured to switch between the at least two modes by a head gesture related in the database 12 to the switching command. This head gesture is in the following called switching gesture. By relating the switching command directly with a switching gesture, the user can without the need of hands within seconds change the use mode of the user-input apparatus. The switching gesture could comprise two or more switching gestures related each directly to another switching command. For example a first switching gesture (calibration gesture) could be used to switch to the calibration mode and/or back in the use mode from the settings mode (first switching command or calibration command) and a second switching gesture (idle gesture) could be used to switch to the idle mode and/or back in the use mode from the idle mode (second switching command or idle command). Alternatively or additionally, different switching gestures could be used to start a mode and to end a mode, e.g. the use mode could have an own switching gesture (use gesture) such that the calibration mode and/or the idle mode is left to the user mode by performing the switching gesture to the user mode. This would also allow to switch from the settings mode directly to the idle mode or vice versa. Alternatively, it is also possible to use the same switching gesture for switching between at least two modes or all three modes. This head gesture based switching of operation modes of the user-input apparatus improves the user-friendliness of the user interface, because the user can switch without the help of a third party or without the need of occupied hands the user-input apparatus into a calibration mode or an idle mode. The switching gesture could be used to switch into other modes.

The settings command/switching command related to the switching gesture/calibration gesture starts the settings mode. In one embodiment, the setting command is a calibration command related to a corresponding calibration gesture. Preferably, the switching gesture/settings gesture is a horizontal head shake. Even more preferably, a horizontal head shake with at least two, preferably three shake cycles. By starting the calibration process by a head gesture related to the calibration, the calibration process can be performed any time during use by the user without any difficulties or burdensome selection of the calibration in a graphical menu. This is in particular useful for head controlled user-input, because the user might get tired performing a certain movement and might want to change for a while the gesture for a certain function. He might also want to change his rest pose which is important for accurate detection of some gestures. By starting the calibrating during use, he could within seconds change his rest head pose to a new more comfortable pose. He could also redo the calibration during use for calibrating the head features, for example when changes his/her appearance. This might happen, when the user starts wearing a cap.

In one embodiment, the settings command/switching command opens a general settings window on a display of the user-input apparatus for configuring different settings of the user input, e.g. mouse speed, calibration of head based gesture control, user profiles and selection of users. Preferably, different settings can be chosen to be configured. In one embodiment, all configurations in the settings mode, e.g. the calibration, are such that they can be accomplished without the need of other input methods than head-based gestures.

In one embodiment, the settings command varies directly a specific setting or enters this setting procedure. Different setting gestures could be used for different setting commands.

It is also possible to have one setting command for entering the general settings window and another setting command for starting a specific settings command for configuring a specific setting.

The idle command/switching command related to the idle gesture/switching gesture starts the idle mode. In the idle mode, most of the head gestures of the use mode are switched off such that the user could change freely his head situation without causing any control commands. This might be useful, when the user starts reading a text on the controlled user-input apparatus or when the user in general does not want that his/her head gestures are used for control. By performing this switch to the idle mode by a head gesture, the control of the user-input on the basis of head gestures is largely improved, because the user could switch between the idle mode and the use mode without the help of any third party or without the need of his hands.

The described switching on the basis of head gestures is very advantageous, but the user-input apparatus could also work without this switching and/or without those different operational modes.

Notwithstanding the progress of handless control presented here, there might arise situations, where the head gesture control touches its limits. This might be the case, when a certain user input or user configuration by head gestures would be too cumbersome or when the detection of a large number of head gestures fails such that the user is not able to perform the calibration him/herself. In this case, the user could transmit the control of and/or the access to his/her system to a remote online support service. The remote service support could than perform the necessary steps by classical user inputs. Preferably, such a support is asked by the user by a head gesture. This head gesture is preferably a head gesture which is very robust even without previous user calibration.

The user-input apparatus 1 can be integrated in an electronic device like a smartphone, a tablet, a personal computer, a notebook, etc. Alternatively, the user-input apparatus 1 can also be a separate device which can be connected wireless or by wire with an electronic device to be controlled (similar to a mouse).

Figure 5:
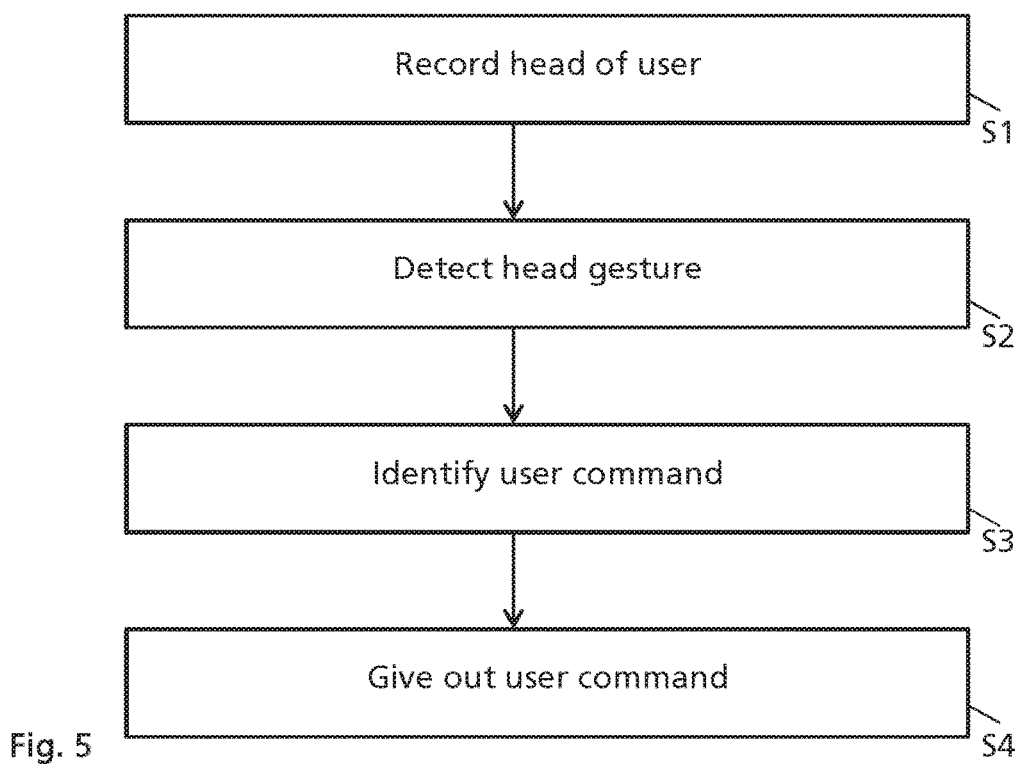
FIG. 5 shows an embodiment of a method for user-input in the normal mode.

FIG. 5 shows now a method to operate a user-input for an electronic device. In a first step S1, the head of the user is recorded by a camera 11 as described above. In a second step S2, a head gesture is detected in the recordings on the basis of head gestures defined in the database 12 as described above. In a third step S3, the user command which relates to the detected head gesture is identified on the basis of the database 12 as described above. In a fourth step S4, the identified user command is given out to control the electronic device as described above.

Figure 6:
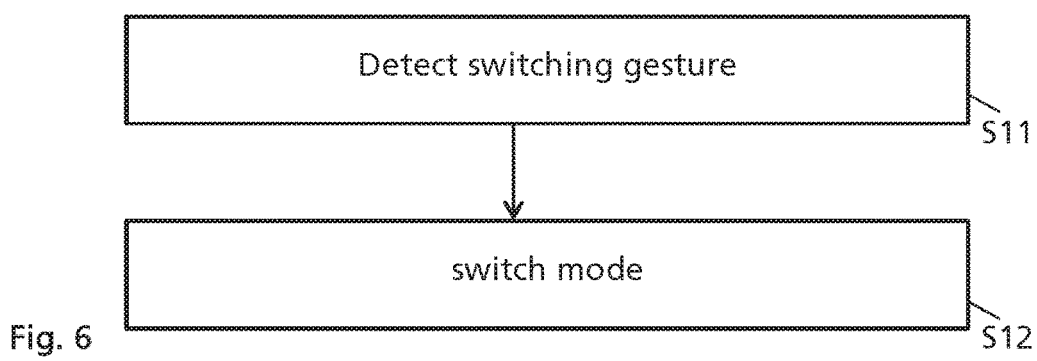
FIG. 6 shows an embodiment of a method to start the settings mode.

FIG. 6 shows the method for switching an operation mode of the user-input method. In a first step, a switching gesture related in the database 12 with the switching command is detected as described in FIG. 5 and the switching command is given out. After the switching command is given out, the user-input method switches from the use mode in the calibration mode or the idle mode.

The above described user-input method can also be performed by a computer program, a computer program product or a non-transitory computer program or a non-transitory computer program product.

The invention claimed is:

1. A user-input apparatus for head gesture based control comprising:
   a camera for recording a head of a user;
   a database for defining a plurality of gestures of the head of the user and for relating at least some of the defined gestures to a corresponding user command;
   a detector for detecting one of the gestures defined in the database in the recording of the camera;
   a controller for identifying a user command in the database related to the detected gesture and for giving out the user command related to the detected gesture;
   a configurator for configuring settings of the user-input apparatus
   wherein one of the defined gestures of the head is a switching gesture and one of the user commands is a switching command related to the switching gesture, wherein, when the switching command is given out from the controller, the user-input apparatus switches between a use mode for the head gesture based control and a settings mode for configuring the user-input apparatus in the configurator or changes the settings of the user-input apparatus,
   wherein the setting mode is a calibration mode, wherein the user-input apparatus is switched from the use mode into the calibration mode by the switching gesture for calibration of the head gestures of the user-input apparatus, or the calibration of the head gestures of the user-input apparatus are changed, and
   wherein the configurator is configured to perform the calibration in the calibration mode without the need of other input operations of the user than gestures of the head of the user.

2. The user-input apparatus according to claim 1, wherein the calibration comprises a detection of user-specific parameters of one or more head gestures.

3. The user-input apparatus according to claim 2, wherein the detection of the user specific parameters of one or more head gestures comprises learning a head rest position.

4. The user-input apparatus according to claim 2, wherein the detection of the user specific parameters of one or more head gestures comprises learning a user-specific speed.

5. The user-input apparatus according to claim 1, wherein the calibration comprises relating user commands to gestures defined in the database.

6. The user-input apparatus according to claim 1, wherein the calibration comprises to newly define or adapt head gestures.

7. The user-input apparatus according to claim 1, wherein the switching command causes in the setting mode to open on a display a window with different settings.

8. The user-input apparatus according to claim 1, wherein the switching command causes to start a head rest pose procedure for detecting the rest pose of the head of the user.

9. The user-input apparatus according to claim 1 having at least two user profiles, wherein the switching command causes to switch from one user profile to another user profile or to calibrate one of the user profiles.

10. The user-input apparatus according to claim 1, wherein the gestures defined in the database comprises a kiss gesture related or to be related to a confirmative user command.

11. The user-input apparatus according to claim 1, wherein the gestures defined in the database distinguish at least two gestures with the same movement, but with at least two different speeds.

12. The user-input apparatus according to claim 1, wherein the camera is configured to record an optical video and a three-dimensional video of the head of the user.

13. The user-input apparatus according to claim 1, wherein the detector is configured to detect gestures of the head of the user by sequentially detecting actual facial landmarks of the head of the user and an actual head position of the head of the user.

14. The user-input apparatus according to claim 1, wherein one of the defined gestures is an online support gesture and one of the user commands is an online support command related to the online support gesture, wherein, when the online support command is given out from the controller, the user-input apparatus connects a remote online support to the user-input apparatus for accessing and controlling the user-input apparatus.

* * * * *